G. B. Perkins,
Floor Clamp.
Nº 81,531.   Patented Aug. 25, 1868.
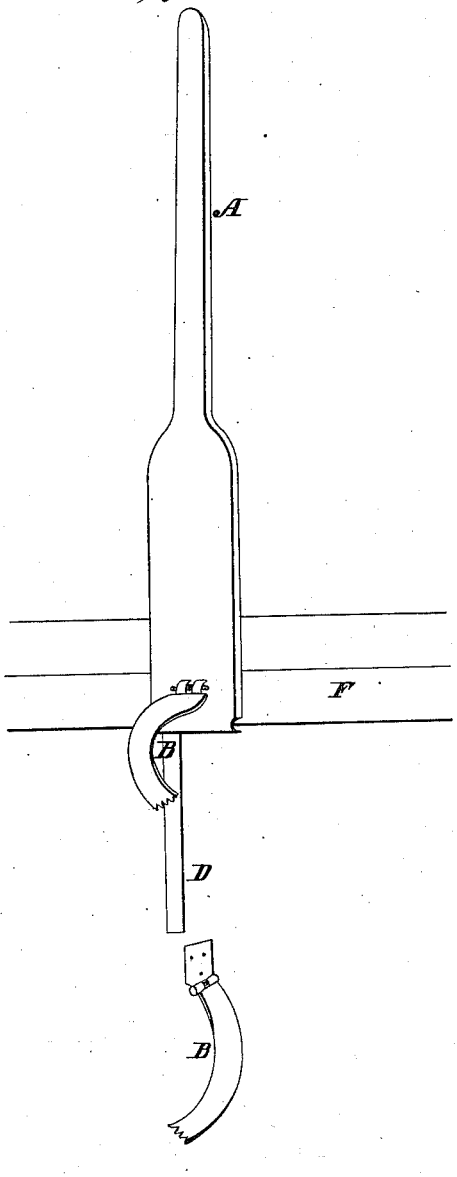
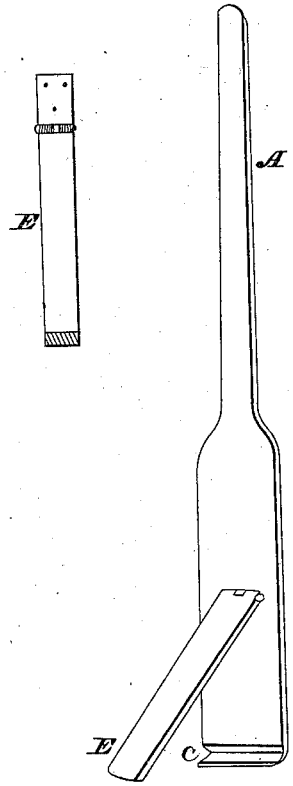
Witnesses:
Robert Spencer Dryer
John Gardin
Inventor:
George B. Perkins.

United States Patent Office.

GEORGE B. PERKINS, OF UTICA, NEW YORK.

Letters Patent No. 81,531, dated August 25, 1868.

---

IMPROVEMENT IN FLOOR-CLAMPS.

---

The Schedule referred to in these Letters Patent and making part of the same.

---

Be it known that I, GEORGE B. PERKINS, of the city of Utica, county of Oneida, in the State of New York, have invented a new and useful machine for laying matched boards for house-floors, or for siding-up buildings or ceiling overhead, where it is desired to be brought up to a close joint. The machine I shall call a Floor-Jack; and I do hereby declare that the following is a full and exact description thereof.

The nature of my invention consists of a piece of hard-wood plank, four feet in length, eight inches broad at one end, and two inches thick, tapered down to two inches in circumference, which forms a handle. At the bottom of the wide end, a half inch from the end, is a groove cut, sufficient to receive the tongue of the board intended to be laid. Right opposite of the groove, on the other side of the handle, is a steel brace, seventeen inches long, made in the shape of a half circle, with a hinge at one end, which is attached to the handle. The other end of this brace is cut with teeth in it, so that, as the groove of the handle is placed on the tongue of the board, by raising the handle, the teeth are inserted into the joist that the board rests on, and the board is crowded up to a tight joint, and held fast to its place by a wooden brace, eighteen inches long, attached to the under side of the handle, seventeen inches from the groove in the handle. As the machine is placed in operation on the board, as the handle is brought up nearly perpendicular, a slight touch with the foot will set the brace, so it will hold the board tight until it can be nailed.

The letters $a$, $b$, C, $d$, and E, describe the different parts of the machine: A, the handle; $b$, the steel brace; C, the groove; $d$, joist; E, the wooden brace; F, the floor.

Claim.

I claim a clamp for laying matched boards, consisting of the lever A, dog B, groove C, and brace E, all constructed to operate substantially as described.

GEORGE B. PERKINS.

Witnesses:
ROBERT SPENCER DRYER,
JOHN EMDIN.